(12) United States Patent
Kanungo et al.

(10) Patent No.: US 12,015,647 B2
(45) Date of Patent: Jun. 18, 2024

(54) SYSTEM AND METHOD FOR SECURING COMPUTER INFRASTRUCTURE AND DEVICES THAT DEPEND ON CLOUD PLATFORMS

(71) Applicant: Tala Secure Inc., Mountain view, CA (US)

(72) Inventors: Rajesh Kanungo, Mountain View, CA (US); Raman Rampura Venkatachar, Bangalore (IN); Benjamin R Loomis, Sunnyvale, CA (US); Saurav Roy, Bangalore (IN)

(73) Assignee: TALA SECURE INC., Mountain View, CA (US)

( * ) Notice: Subject to any disclaimer, the term of this patent is extended or adjusted under 35 U.S.C. 154(b) by 283 days.

(21) Appl. No.: 17/522,412

(22) Filed: Nov. 9, 2021

(65) Prior Publication Data
US 2022/0150281 A1    May 12, 2022

Related U.S. Application Data

(60) Provisional application No. 63/205,041, filed on Nov. 10, 2020.

(51) Int. Cl.
| | | |
|---|---|---|
| H04L 9/40 | (2022.01) | |
| G06F 16/2455 | (2019.01) | |
| G06N 20/00 | (2019.01) | |

(52) U.S. Cl.
CPC .......... *H04L 63/20* (2013.01); *G06F 16/2455* (2019.01); *G06N 20/00* (2019.01); *H04L 63/0272* (2013.01)

(58) Field of Classification Search
None
See application file for complete search history.

(56) References Cited

U.S. PATENT DOCUMENTS

2016/0359915 A1* 12/2016 Gupta ..................... H04L 43/04

* cited by examiner

*Primary Examiner* — Brandon Hoffman

(57) ABSTRACT

The embodiment herein provides a system for securing computer infrastructure and one or more devices that depend on one or more cloud platforms. The system includes a memory, and a processor that stores and executes a set of instructions. The processor is configured to (i) extract one or more information data from at least one of the cloud platforms or the devices that depends on the one or more cloud platforms, (ii) execute compliance tests to identify compliance and non-compliance in the one or more information data, (iii) generate a network topology map by querying the one or more information data, (iv) classify a connectivity between the one or more devices and their nature, (v) compute risk metrics, (vi) re-execute the compliance tests to detect changes, and (vii) implement security compliances without impacting a production or operational environment of the one or more cloud platforms.

14 Claims, 15 Drawing Sheets

SYSTEM AND METHOD FOR SECURING COMPUTER INFRASTRUCTURE AND DEVICES THAT DEPEND ON CLOUD PLATFORMS

BACKGROUND

Technical Field

The embodiments herein generally relate to an infrastructure security, and more particularly, to a system and method for securing computer infrastructure and devices that depend on cloud platforms by automating a large portion of ensuring security compliance.

Description of the Related Art

Infrastructure security is typically applied on environments in order to protect a computer infrastructure that initiates preventive measures to deny unauthorized access, modification, deletion and theft of resources and data.

New computer infrastructure has to ensure security to prevent a large part of the computing infrastructure from being exposed to the internet and to hackers, and the communication to and from a cloud system over the internet as there is no physical perimeter, that may arise in uncontrolled growth in adding computing and storage resources without knowledge of a user or concerned person. Reconfiguration of systems, networking, firewalls, storage and access to storage and computing resources is easier in the cloud than physical systems as the cloud systems are configured using software commands. A large number of security breaches have occurred in the cloud systems because of improper security and includes a more difficult process to prove security compliance and maintenance, identify the computing, storage, and networking assets and system information to provide current documentation, and ensuring of controls required to ensure security compliance.

Most of the security systems ensure security in the computer infrastructure but it is based on collecting a system description and information manually. If there is a clerical error in the collected system description and information, the total security system may be affected based on that. Further, identification of necessary controls and meeting compliance are manual, and identifying missing controls and implementing are also manual. Existing security systems do not verify the missing controls as the verifying and the implementation of the controls are also manual. Most of the data are entered manually in the security system that makes the data stale, and there is a shortage of security experts with skilled security expertise around the world to interpret the data. Further, the existing systems provide security only to the computer infrastructure with the cloud platform.

Accordingly, there remains a need for a system and method for securing computer infrastructure and devices that depend on cloud platforms by automating a large portion of ensuring security compliance.

SUMMARY

In view of the foregoing, an embodiment herein provides a system for securing computer infrastructure and one or more devices that depend on one or more cloud platforms. The system includes a memory and a processor. The memory stores a set of instructions. The processor executes the set of instructions. The processor is configured to extract one or more information data from at least one of the cloud platforms or the one or more devices that depend on the one or more cloud platforms. The one or more information data includes at least one of system information from the one or more cloud platforms, configuration information, system information from cloud platform associated services, non-cloud infrastructure information, or asset information. The processor is configured to execute compliance tests to identify compliance and non-compliance in the one or more information data. The processor is configured to generate a network topology map of the one or more cloud platforms by querying the one or more information data. The querying of the one or more information data includes (i) identifying an environment with the one or more information data, (ii) creating a tree for the identified environment, and (iii) converting the tree into a directed graph. The directed graph generates the network topology map using a rendering engine. The processor is configured to classify a connectivity between the one or more devices and their nature with at least one of logs, firewall rules, Virtual Private Cloud (VPC) accesses, or a cloud storage (e.g. an S3 bucket) level logs and object level access logs, extracted from the one or more information data, using a machine learning model. The machine learning model is configured to (i) record the connectivity between the one or more devices that are consolidated under the one or more cloud platforms, and (ii) analyze the records to determine which endpoints of the one or more devices that are in connectivity with each other. The processor is configured to compute risk metrics based on at least one of the network topology map, software running on the computer infrastructure or the one or more devices that depend on the one or more cloud platforms, the connectivity between the one or more devices or criticality of the asset information using the machine learning model. The processor is configured to re-execute the compliance tests to detect changes in the identified compliance in the one or more information data, and implement security compliances in the one or more information data without impacting a production or operational environment of the one or more cloud platforms when there is a change in the compliance, for securing the computer infrastructure and the one or more devices that depend on the one or more cloud platforms.

In some embodiments, the system information from the one or more cloud platforms includes users, access rights associated with the users, an authentication method associated with the users, groups associated with the users, VPC configuration information and assets contained in the VPC configuration information. The configuration information includes the VPC configuration information and the assets contained in the VPC configuration. The non-cloud infrastructure information includes endpoint configuration security information comprising at least one of use of encrypted storage, Virtual Private Network (VPN), 2FA, antivirus checkers, whitelist of applications or traffic monitoring, from the one or more devices. The asset information includes physical security information using management asset systems.

In some embodiments, the processor is configured to determine at least one of logging systems, monitoring systems, protection systems, virus checkers, incidence response systems, backup systems, or recovery systems that are present for each and every asset in the one or more cloud platforms before executing the compliance tests.

In some embodiments, the compliance tests include executing of compliance rules in the one or more information data. The compliance rules include at least one of Amazon Web Services (AWS) security rules or third-party security rules.

In some embodiments, the processor is configured to identify missing controls in the one or more cloud platforms, and provide information of the missing controls to a user. The missing controls include at least one of a missing 2-factor authentication or a use of VPN for management.

In some embodiments, the processor is configured to enable addition of meta-information that enables the user to include the meta-information after generating the network topology map of the one or more cloud platforms. The meta-information includes at least one of the criticality of resources, links to disaster recovery plans, incidence response plans, business continuity importance, or results of penetration tests.

In some embodiments, the processor is configured to implement the security compliances as a regular scheduled check for the compliance and security, and generate reports when there is the regular scheduled check or when there is a change in the compliance.

In some embodiments, the processor is configured to generate the report in a machine-readable report format that enables exchange of information between the one or more devices with verification of compliance between different devices.

In another aspect, an embodiment herein provides a method for securing computer infrastructure and one or more devices that depend on one or more cloud platforms. The method includes extracting one or more information data from at least one of the cloud platforms or the one or more devices that depend on the one or more cloud platforms. The one or more information data includes at least one of system information from the one or more cloud platforms, configuration information, system information from cloud platform associated services, non-cloud infrastructure information or asset information. The method includes executing compliance tests to identify compliance and non-compliance in the one or more information data, and generating a network topology map of the one or more cloud platforms by querying the one or more information data. The querying of the one or more information data includes (i) identifying an environment with the one or more information data, (ii) creating a tree for the identified environment, and (iii) converting the tree into a directed graph. The directed graph generates the network topology map using a rendering engine. The method includes classifying a connectivity between the one or more devices and their nature with at least one of logs, firewall rules, Virtual Private Cloud (VPC) accesses, or a cloud storage (e.g. an S3 bucket) level logs and object level access logs, extracted from the one or more information data, using a machine learning model. The machine learning model is configured to (i) record the connectivity between the one or more devices that are consolidated under the one or more cloud platforms and (ii) analyse the records to determine which endpoints of the one or more devices that are in connectivity with each other. The method includes computing risk metrics based on at least one of the network topology map, software running on the computer infrastructure or the one or more devices that depend on the one or more cloud platforms, the connectivity between the one or more devices or criticality of the asset information, using the machine learning model. The method includes re-executing the compliance tests to detect changes in the identified compliance in the one or more information data, and implementing security compliances in the one or more information data without impacting a production or operational environment of the one or more cloud platforms when there is a change in the compliance, for securing the computer infrastructure and the one or more devices that depend on the one or more cloud platforms.

In some embodiments, the method includes determining at least one of logging systems, monitoring systems, protections systems, virus checkers, incidence response systems, backup systems, recovery systems that are present for each and every asset in the one or more cloud platforms before executing the compliance tests.

In some embodiments, the compliance tests include executing of compliance rules in the one or more information data. The compliance rules include at least one of AWS security rules or third-party security rules.

In some embodiments, the method includes identifying missing controls in the one or more cloud platforms, and providing information of the missing controls to a user. The missing controls include at least one of a missing 2-factor authentication or a use of VPN for management.

In some embodiments, the method includes enabling addition of meta-information that enables the user to include the meta-information after generating the network topology map of the one or more cloud platforms. The meta-information includes at least one of the criticality of resources, links to disaster recovery plans, incidence response plans, business continuity importance, or results of penetration tests.

In some embodiments, the method includes implementing the security compliances as a regular scheduled check for the compliance and security, and generating reports when there is the regular scheduled check or when there is the change in the compliance.

In some embodiments, the method includes generating the report in a machine-readable report format that enables exchange of information between the one or more devices with verification of compliance between different devices.

The system is a single tool that automates a large portion of ensuring the security compliance in the computer infrastructure and the devices that depend on the cloud platforms. The third-party security rules use AWS and other custom rules to detect more compliance issues. Re-executing the compliance tests provides documentation for a certification, for example, SOC2, PCI, or other certification that requires proof that the system has been compliant over a period of time. The system provides all the security compliance services without impacting production or operational environment in any significant way.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
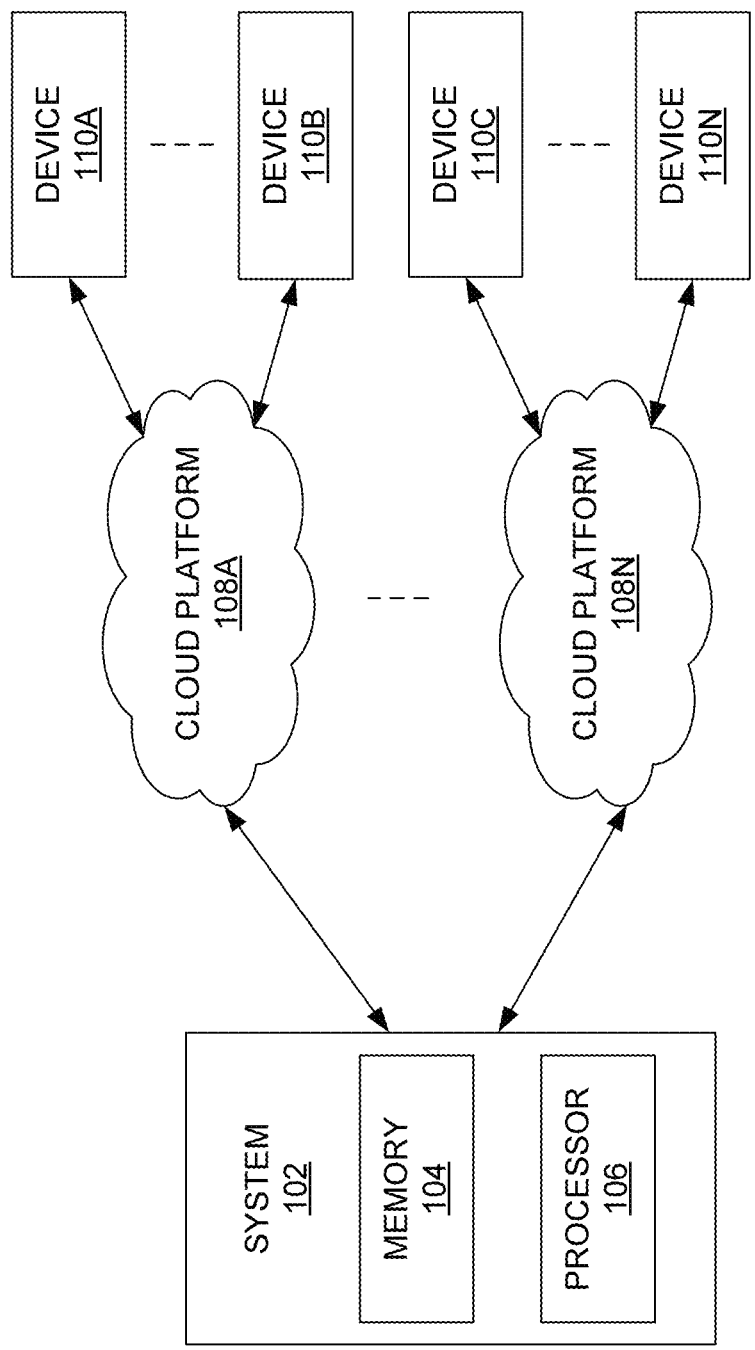
FIG. 1 illustrates a system view of a computer infrastructure for securing computer infrastructure and one or more devices that depend on one or more cloud platforms using a system according to some embodiments herein.

In the accompanying drawings, a number is employed to represent an item over which the number is positioned or an item to which the number is adjacent.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for securing computer infrastructure and devices that depend on cloud platforms by automating a large portion of ensuring security compliance. Referring now to the drawings, and more particularly to FIGS. 1 through 9, where similar reference characters denote corresponding features consistently throughout the figures, there are shown preferred embodiments.

FIG. 1 illustrates a system view of a computer architecture for securing computer infrastructure and one or more devices 110A-N that depends on one or more cloud platforms 108A-N using a system 102 according to some embodiments herein. The computer architecture includes the system 102, the one or more cloud platforms 108A-N, and the one or more devices 110A-N. The system 102 is associated with the computer infrastructure. In some embodiment, the computer infrastructure is associated with a user. The system 102 may be associated with at least one of cloud-based infrastructure, cloud centric infrastructure, or cloud accessible infrastructure. The system 102 includes a memory 104 and a processor 106. The memory 104 stores a set of instructions. The set of instructions may include steps and iterations to secure the computer infrastructure and the one or more devices 110A-N that depends on the one or more cloud platforms 108A-N. The processor 106 executes the set of instructions. The processor 106 is configured to extract one or more information data from at least one of the cloud platforms 108A-N or the one or more devices 110A-N that depends on the one or more cloud platforms 108A-N. The one or more information data includes at least one of system information from the one or more cloud platforms 108A-N, configuration information, system information from cloud platform associated services, non-cloud infrastructure information or asset information.

In some embodiments, the system information from the cloud platforms 108A-N includes users, access rights associated with the users, an authentication method associated with the users, groups associated with the users, VPC configuration information and assets contained in the VPC configuration information. In some embodiments, the configuration information includes the VPC configuration information and the assets contained in the VPC configuration. The non-cloud infrastructure information may include endpoint configuration security information including at least one of use of encrypted storage, Virtual Private Network (VPN), 2FA, antivirus checkers, whitelist of applications or traffic monitoring, from the one or more devices 110A-N. The asset information may include physical security information using management asset systems.

The processor 106 is configured to execute compliance tests to identify compliance and non-compliance in the one or more information data. The compliance tests may include executing of compliance rules in the one or more information data. In some embodiments, the compliance rules include at least one of AWS security rules or third-party security rules. For example, the AWS security rules check for compliance and they flag up an issue if compliance isn't there. A collection of such rules is grouped together to uphold a standard like NIST-CSF etc, and such a collection is called a conformance pack. In some embodiments, the processor 106 is configured to determine at least one of logging systems, monitoring systems, protections systems, virus checkers, incidence response systems, backup systems, recovery systems that are present for each and every asset in the one or more cloud platforms 108A-N before executing the compliance tests.

The processor 106 is configured to generate a network topology map of the one or more cloud platforms 108A-N by querying the one or more information data. The processor 106 queries the one or more information data by (i) identifying an environment with the one or more information data, (ii) creating a tree for the identified environment, and (iii) converting the tree into a directed graph. In some embodiments, the directed graph generates the network topology map using a rendering engine. The processor 106 is configured to classify a connectivity between the one or more devices 110A-N and their nature with at least one of logs, firewall rules, Virtual Private Cloud (VPC) accesses, or a a cloud storage (e.g. an S3 bucket) level logs and object level access logs, extracted from the one or more information data, using a machine learning model.

The machine learning model is configured to (i) record the connectivity between the one or more devices 110A-N that are consolidated under the one or more cloud platforms 108A-N, and (ii) analyze the records to determine which endpoints of the one or more devices 110A-N that are in connectivity with each other. The one or more devices 110A-N that are consolidated under the one or more cloud platforms 108A-N may include, for example, Amazon AWS services such as Virtual Private Cloud (VPC), Simple Storage Service (S3) bucket level logs and object level logs, Elastic Compute Cloud (EC2), and Relational Database Service (RDS), or other similar services by other cloud service providers that may be consolidated under different log groups under logging systems, fir example, Amazon CloudWatch, CloudTrails, or similar cloud logging services. The machine learning model may measure baseline connectivity to assist in flagging suspicious activity due to changes in traffic pattern.

The processor 106 is configured to compute risk metrics based on at least one of the network topology map, software running on the computer infrastructure or the one or more devices 110A-N that depends on the one or more cloud platforms 108A-N, the connectivity between the one or more devices 110A-N or criticality of the asset information, using the machine learning model.

The processor 106 is configured to re-execute the compliance tests to detect changes in the identified compliance in the one or more information data. The processor 106 is configured to implement security compliances without impacting a production or operational environment of the one or more cloud platforms 108A-N when there is a change in the compliance in the one or more information data, for securing the computer infrastructure and the one or more devices 110A-N that depends on the one or more cloud platforms 108A-N. In some embodiments, the processor 106 is configured to (i) implement the security compliances as a regular scheduled check for the compliance and security, and (ii) generate reports when there is the regular scheduled check or when there is the change in the compliance.

In some embodiments, the processor 106 is configured to generate the report in a machine-readable report format that enables exchange of information between the one or inure devices 110A-N with verification of compliance between different devices. The processor 106 may validate compliance of an entire organization that includes not only one or more cloud platforms 108A-N but also multiple accounts in each of one or more cloud platforms 108A-N. In some embodiments, the processor 106 is configured to (i) identify missing controls in the one or more cloud platforms 108A-N, and (ii) provide information of the missing controls to a user. The missing controls may include at least one of a missing 2-factor authentication or a use of VPN for management. The information of the missing controls may be a proof of the compliance or the non-compliance.

In some embodiments, the processor 106 is configured to enable addition of meta-information that enables the user to include the meta-information after generating the network topology map of the one or more cloud platforms 108A-N. The meta-information may include at least one of the criticality of resources, links to disaster recovery plans, incidence response plans, business continuity importance, or results of penetration tests.

In some embodiments, the system 102 provides a centralized facility for capturing information and controls that are manual, i.e. capturing proof of security training manually. The system 102 may capture this information using forms with a user interface in the computer infrastructure.

Figure 2:
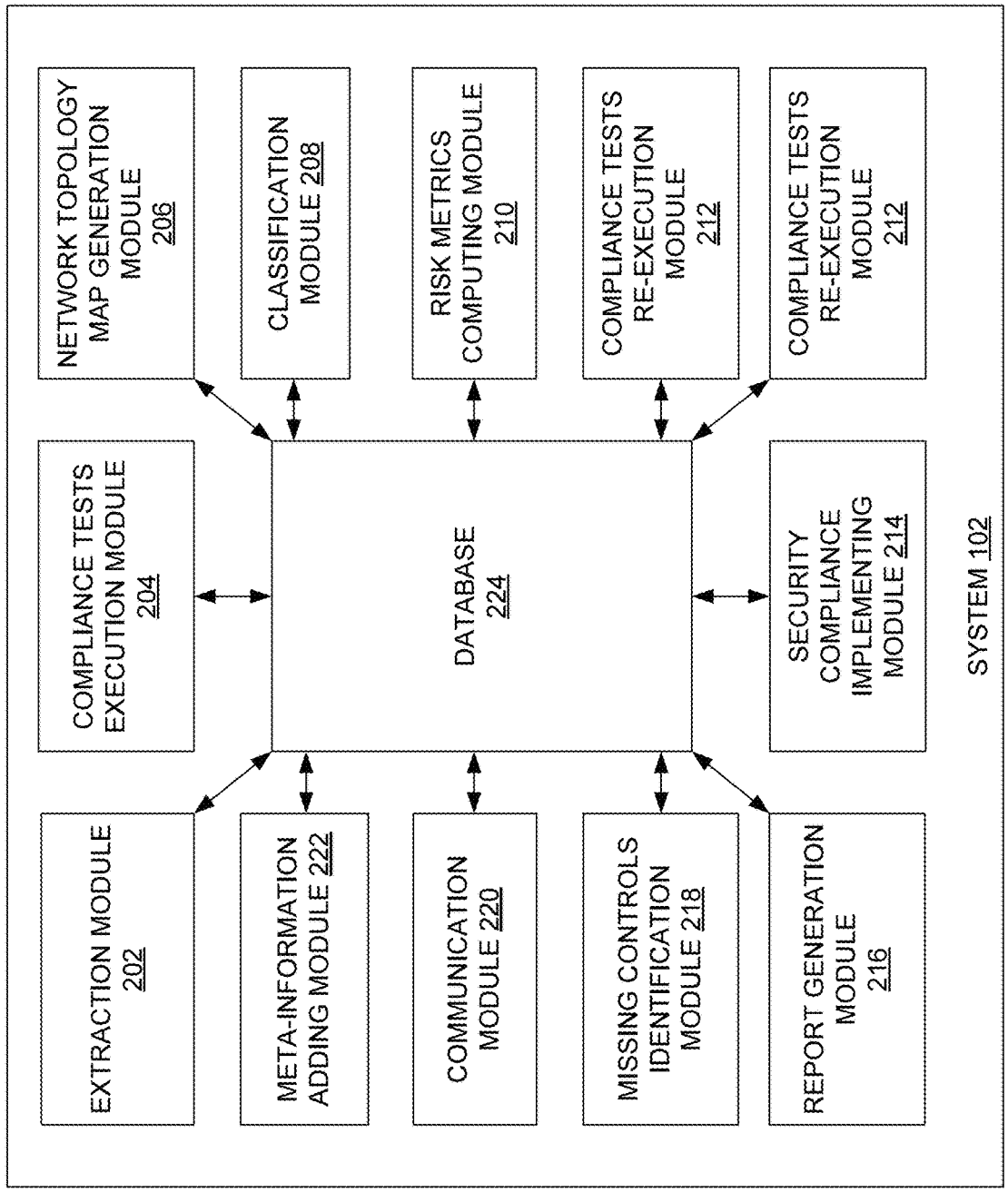
FIG. 2 illustrates a block diagram of the system of FIG. 1 for securing the computer infrastructure and the one or more devices that depend on the one or more cloud platforms according to some embodiments herein.

FIG. 2 illustrates a block diagram of the system 102 of FIG. 1 for securing the computer infrastructure and the one or more devices 110A-N that depends on the one or more cloud platforms 108A-N according to some embodiments herein. The system 102 includes an extraction module 202, a compliance tests execution module 204, a network topology map generation module 206, a classification module 208, a risk metrics computing module 210, a compliance tests re-execution module 212, a security compliance implementing module 214, a report generation module 216, a missing controls identification module 218, a communication module 220, a meta-information adding module 222, and a database 224.

The extraction module 202 is configured to extract the one or more information data from at least one of the cloud platforms 108A-N or the one or more devices 110A-N that depend on the one or more cloud platforms 108A-N. The one or more information data includes the system information from the one or more cloud platforms 108A-N, the configuration information regarding topology and interaction between systems, the system information from associated devices, other non-cloud infrastructure information, and the asset information. The system information from the one or more cloud platforms 108A-N may be extracted using Amazon Web Services (AWS), Azure, or Google Application Programming Interfaces (APIs). The system information from the AWS may include AWS account management APIs to extract users, their access, their authentication method, their groups and the like, AWS Virtual Private Cloud (VPC) APIs to get the VPC configuration and the assets contained in the VPC configuration, AWS Key Management Service (KMS) to obtain key management details including key rotation, use of keys to access databases, AWS S3 to extract the access, encryption, and signed Uniform Resource Locators (URL's) needed to access the resources, AWS CloudTrails® to access an account logging, any security package installed, software information including software loaded on servers, and AWS Relational Database Service (RDS) and information about access, key rotation, and storage, and the like.

The configuration information includes extracting the assets from the VPC configuration. The system information from the associated services may include other products to register their configuration on the one or more cloud platforms 108A-N. In some embodiments, the system information from the associated services are extracted by information from the AWS. The other non-cloud infrastructure information may be extracted using device management systems. In some embodiments, the device management systems are Microsoft Intune®, and Airwatch®. The device management system extracts endpoint configuration security information like use of encrypted storage, VPN, 2FA, anti-virus checkers, whitelist of applications, and traffic monitoring. The asset information may be physical security information that may be extracted using management asset systems and their APIs.

The compliance tests execution module 204 is configured to execute the compliance tests to identify compliance and non-compliance in the one or more information data. In some embodiments, the compliance tests are running of compliance rules. The compliance rules may be AWS security rules or third-party security rules. The AWS security rules may include AWS SOC2 and AWS NIST CyberSecurity Framework (MST-CSF) rules. The third-party security rules use AWS and other custom rules to detect more compliance issues based on at least one of ISO 27001 rules, and infrastructure and other information gathered on the extraction module 202.

The network topology map generation module 206 is configured to generate the network topology map of the one or more cloud platforms 108A-N by querying the one or more information data. In some embodiments, the network topology map is generated by querying cloud APIs and the configuration information. The classification module 208 is configured to classify the connectivity between the one or more devices 110A-N and their nature. The risk metrics computing module 210 is configured to compute the risk metrics based on at least one of the network topology map, the software running on the computer infrastructure or the one or more devices 110A-N that depends on the one or more cloud platforms 108A-N, the connectivity between the one or more devices 110A-N or criticality of the asset information, using the machine learning model. In some embodiments, the system 102 includes flag introduction, flag removal, or flag changes in any configuration, like removal of an EC2 server, or an addition of an RDS database. The system 102 may notify the flag introduction, the flag removal or the flag changes in any configuration.

The compliance tests re-execution module 212 is configured to re-execute the compliance tests to detect the changes in the identified compliance in the one or more information data. The re-execution of the compliance tests provide documentation for certification (e.g. SOC2 Type 2 certification). The security compliances implementing module 214 is configured to implement the security compliances without impacting the production or the operational environment of the one or more cloud platforms 108A-N when there is a change in the compliance in the one or more information data. In some embodiments, the system 102 is installed without impacting personnel or the computer infrastructure. The security compliances implementing module 214 may run whenever there is a change notified by an AWS configuration management, and includes automatic running of automated AWS compliance rules when there is a change. The security compliances implementing module 214 may run as a regularly scheduled check for both the compliance and security.

The report generation module 216 is configured to generate the report in the machine-readable report format that enables exchange of the information between the one or more devices 110A-N. In some embodiments, the report generation module 216 generates the report in a PDF format. The report generation module 216 may enable exchange of the information between the one or more devices 110A-N and allow verification of compliance between different organizational units that don't share systems. In some embodiments, the format is to report conformance to their systems rules i.e. banks and their vendors, different healthcare organizations, bank to bank, and financial institutions to ensure their compliance. In some embodiments, the report generation module 216 delivers reports on a regular schedule or when there is a change. High level and asset level system information is required only for manual test, and to be entered by the user.

The missing controls identification module 218 is configured to identify the missing controls in the one or more cloud platforms 108A-N. The communication module 220 is configured to communicate the information of the missing controls to the user. The communication module 220 may communicate the information of the missing controls using at least one of a wired communication or a wireless communication. In some embodiments, the communication module 220 sends a notification when one organization falls out of compliance to allow for immediate mitigation steps to be taken by the organizations depending on the non-compliant systems. The notification may be sent using Web Sockets, emails, or polling web APIs.

The meta-information adding module 222 is configured to add the meta-information after generating the network topology map of the one or more cloud platforms 108A-N. The meta-information may include the criticality of a resource, links to disaster recovery plans, incidence response plans, business continuity importance, or results of penetration tests. In some embodiments, the user can enter data by clicking information on the network topology map.

The database 224 is configured to connect and communicate with the extraction module 202, the compliance tests execution module 204, the network topology map generation module 206, the classification module 208, the risk metrics computing module 210, the compliance tests re-execution module 212, the security compliance implementing module 214, the report generation module 216, the missing controls identification module 218, the communication module 220, and the meta-information adding module 222, to secure the computer infrastructure and the one or more devices 110A-N that depends on the one or more cloud platforms 108A-N.

In some embodiments, the system 102 enables the compliance tests continuously with codes as follows:

For Setup APIs (IaaS),
1. Deploy a conformance pack into AWS Config
public PutConformancePackResult
AmazonConfigClient::putConfornmcePack(PutConformancePackRequest request)
2. Create a Database Cluster
public CreateDBClusterResponse
AmazonRDSClient::createDBCluster(Create BClusterRequest request)
3. Create S3 bucket
public Bucket AmazonS3::createBucket(CreateBucketRequest createBucketRequest)
For AWS Config,
1. Get Compliance Results
Public GetConformancePackComplianceDetailsResult
AmazonConfigClient:getConformancePackComplianceDetails(GetConformancePackCompliancdetailsRequest request)
For AWS S3,
1. Get Objects from Bucket
Public S3Object AmazonS3::getObject(String bucketName, String key)
For AWS RDS,
1. Get Dashboard data—history of evaluation runs
Public ExecuteStatementResult
AWSRDSData::executeStatement(ExecuteStatementRequest executeStateinentRequest)

Figure 3:
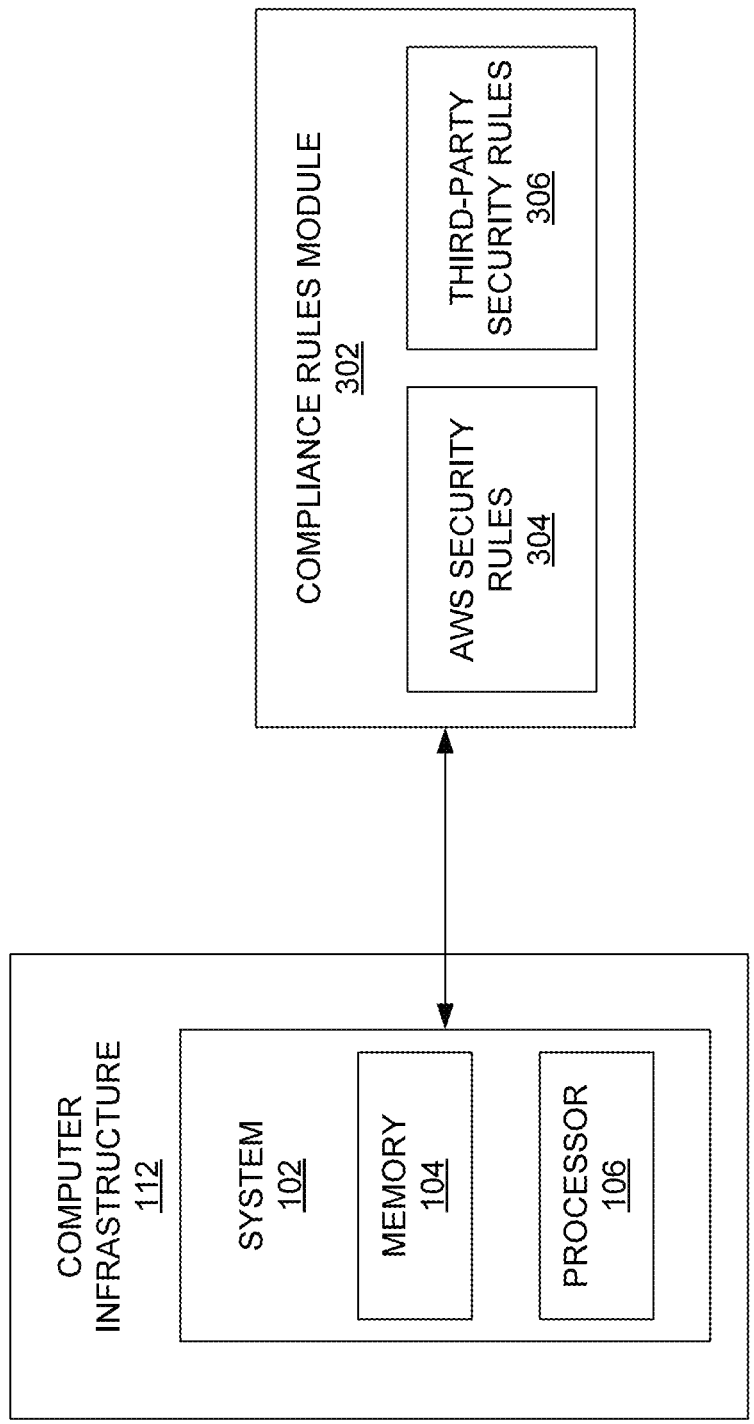
FIG. 3 illustrates a structure of compliance rules for executing the compliance tests in the system of FIG. 1 according to some embodiments herein.

FIG. 3 illustrates a structure of compliance rules for executing the compliance tests in the system 102 of FIG. 1 according to some embodiments herein. The structure includes a compliance rules module 302, and the computer infrastructure with the system 102. The compliance rules module 302 includes Amazon Web Services (AWS) security rules 304 and third-party security rules 306, to execute the compliance tests in the system 102. The AWS security rules 304 may include AWS Service Organizational Control 2 (SOC2) rules and AWS National Institute of Standards and Technology—Cybersecurity Framework (NIST CSF) rules. In some embodiments, the AWS SOC2 rules are used as a conformance pack developed using bespoke AWS managed rules and custom rules exclusively coded for the conformance pack. In some embodiments, the AWS NIST CSF rules are used as a conformance pack provided by AWS. The third-party security rules 306 may include ISO27001 rules. In some embodiments, the third-party security rules 306 implement SOC2 rules if required by the compliance rules module 302. The SOC2 conformance pack and the NIST CSF conformance pack may be deployed on security controls available within respective specifications of the standard.

In some embodiments, the system 102 includes a failed set module that includes a failed set. The failed set may include failed iterations, failed packs, failed rules and failed cases. The system 102 may run the failed set on at least one of demand, periodically or on triggers like a configuration change. The failed set may automatically be set to green once the issue is rectified. In some embodiments, the system 102 delivers a message using a message queuing service Simple Queue Service, SQS) to an endpoint like alerting or messaging system (e.g. Slack, Bots and CRM) whenever there is a change in status.

Figure 4:
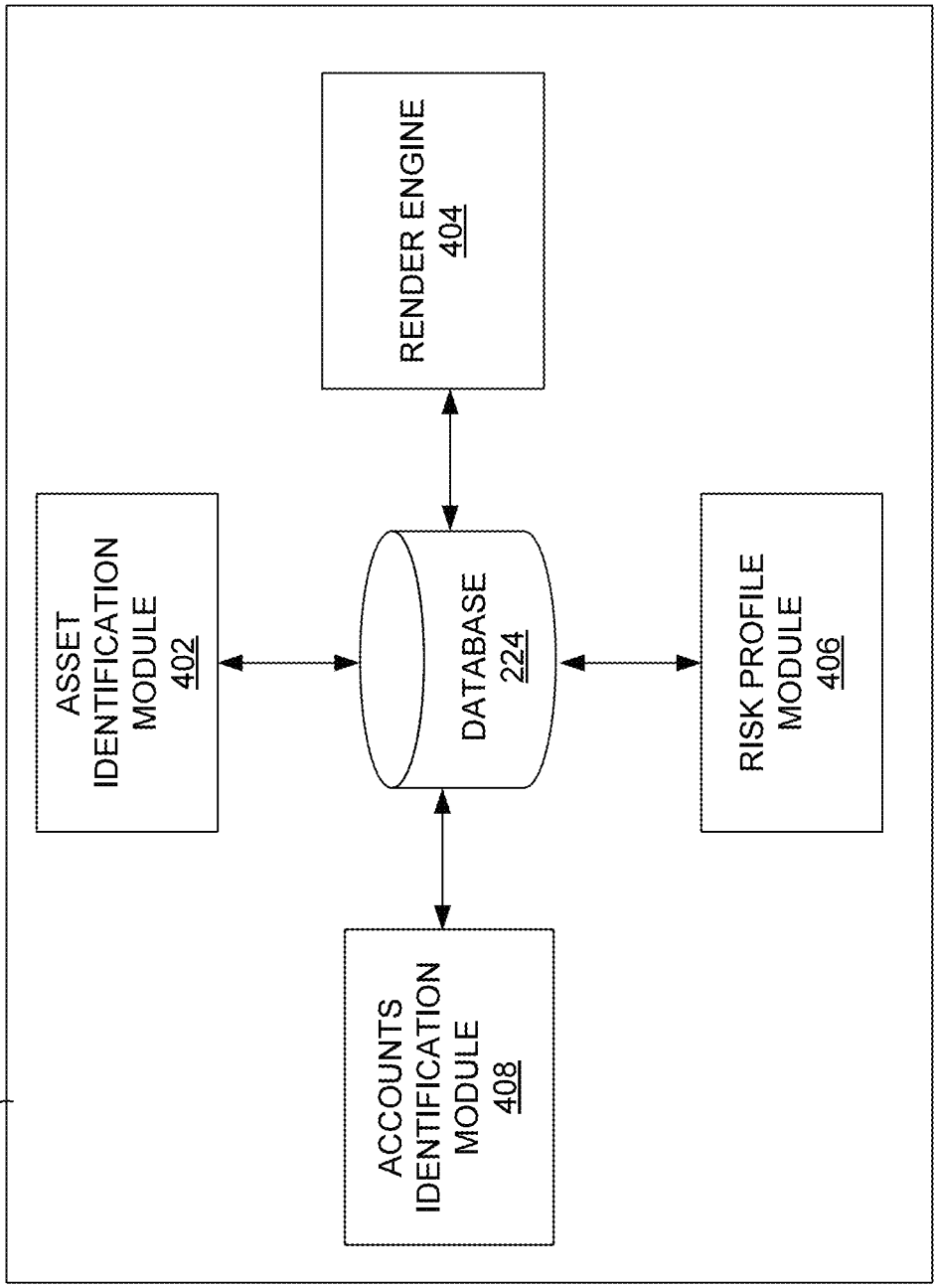
FIG. 4 illustrates a block diagram of the system of FIG. 1 according to some embodiments herein.

FIG. 4 illustrates a block diagram of the system 102 of FIG. 1 according to some embodiments herein. The system 102 includes an asset identification module 402, a render engine 404, a risk profile module 406, and an accounts identification module 408. The asset identification module 402 is configured to identify assets associated with the VPC. The asset identification module 402 may call AWS to obtain the assets. In some embodiments, an environment is discovered using one or more multiple AWS APIs. The environment may include configuration discovered resources that iterate over one or more Infrastructure as a Service (IaaS) and Platform as a Service (PaaS) components in AWS. A tree is constructed for a static environment with the VPC with a set of attributes as root. The other AWS components in a subnet may become its children. In some embodiments, the asset identification module 402 includes a containership including each resource associated with VPC, subnet, and routing rules. The constructed tree is an input to the render engine 404 that renders the constructed tree to display on the system 102. In some embodiments, the render engine 404 is a CloudMapper. The constructed tree may be converted into a directed graph on information and data flow analysis. In some embodiments, the render engine 404 accepts the constructed tree by pivoting a graph on a node with indegree 0. The node may have directional edges denoting information flow, i.e. EC2→S3. The render engine 404 renders the constructed tree with user interface formatting and styling. In some embodiments, the render engine 404 renders the network topology map.

The risk profile module 406 is configured to select a risk model that enables calculation of risk in the system 102 for a risk function. In some embodiments, the risk profile module 406 tag assets with functional groups and criticality. The functional groups may be a Business Unit (BU) and/or type. The criticality may be at least one of critical, high, medium, or low. The risk profile module 406 includes components that can be assigned with the default risk profile. The user may override at instance level. In some embodiments, the rules against the component type include a weight in a function of risk calculation. The risk profile module 406 may select the risk model based on usage frequency, images deployed, exposure to the internet, data stored, and the like, to add weights into the risk function. The system 102 including the machine learning model enables risk weight. In some embodiments, the system 102 includes an input module that enables the user to provide a user input in a user interlace.

The accounts identification module 408 is configured to access an account with a token. The account may be associated with an organization. The token may be from Amazon Security Token Service (STS). The accounts identification module 408 may include configurations with read only rights. In some embodiments, the token includes a time limit and that is generated in the system 102 just-in-time of evaluation. In some embodiments, the accounts identification module 408 accesses one or more accounts of the organization with the token and runs rules on the one or more accounts. In some embodiment, the accounts identification module 408 includes running of rules against the account of the organization with a requirement of an organization level account access using an aggregator.

Figure 5:
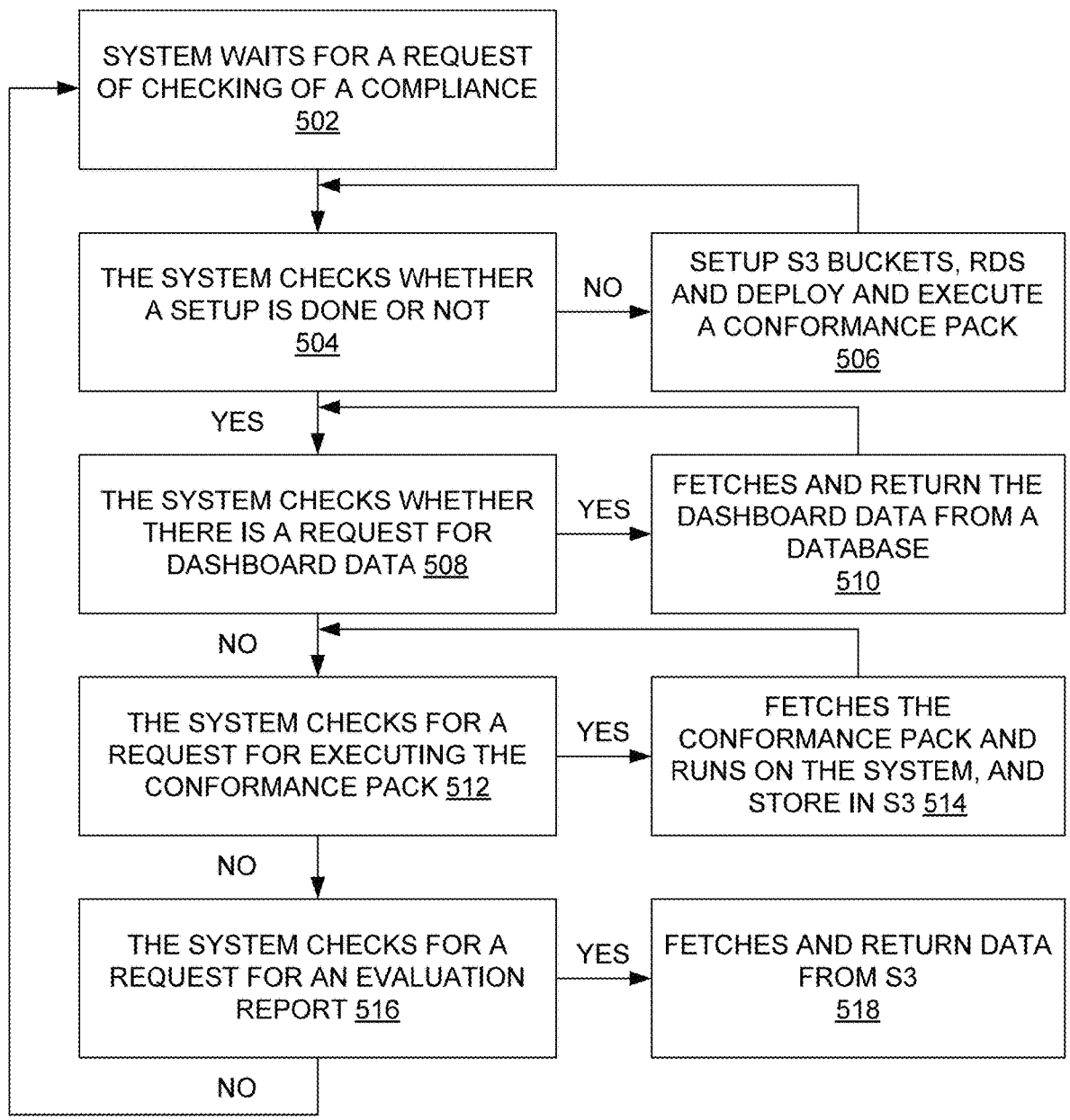
FIG. 5 is an exemplary flow diagram that illustrates a method of checking of compliance in the system of FIG. 1 according to some embodiments herein.

FIG. 5 is an exemplary flow diagram that illustrates a method of checking of compliance in the system 102 of FIG. 1 according to some embodiments herein. At a step 502, the system 102 waits for a request of checking of the compliance. At a step 504, the system 102 checks whether the setup is done or not. If the setup is not done, the system 102 moves to a step 506 that sets up S3 buckets, RDS, deploys and executes the conformance pack. If the setup is done, the system 102 moves to a step 508 that the system 102 checks whether there is a request for dashboard data. If there is the request for the dashboard data, the system 102 moves to a step 510, that fetches and returns the dashboard data from a database. In some embodiments, the database is an Aurora My SQL Serverless database. The system 102 moves to a step 512 if there is no request for the dashboard data. At the step 512, the system 102 checks for a request for executing the conformance pack. If there is a request for executing the conformance pack, the system 102 moves to a step 514 that fetches the conformance pack and runs on the system 102, and stores the result in S3. If there is no request for executing the conformance pack, the system 102 moves to a step 516, that checks for a request for an evaluation report. If the system 102 requests for the evaluation report, the system 102 moves to a step 518 that fetches and returns data from S3. In some embodiments, the data is at least one of the machine-readable format report or a PDF format report. The system 102 moves to the step 502 if there is no request for the evaluation report.

Figure 6A:
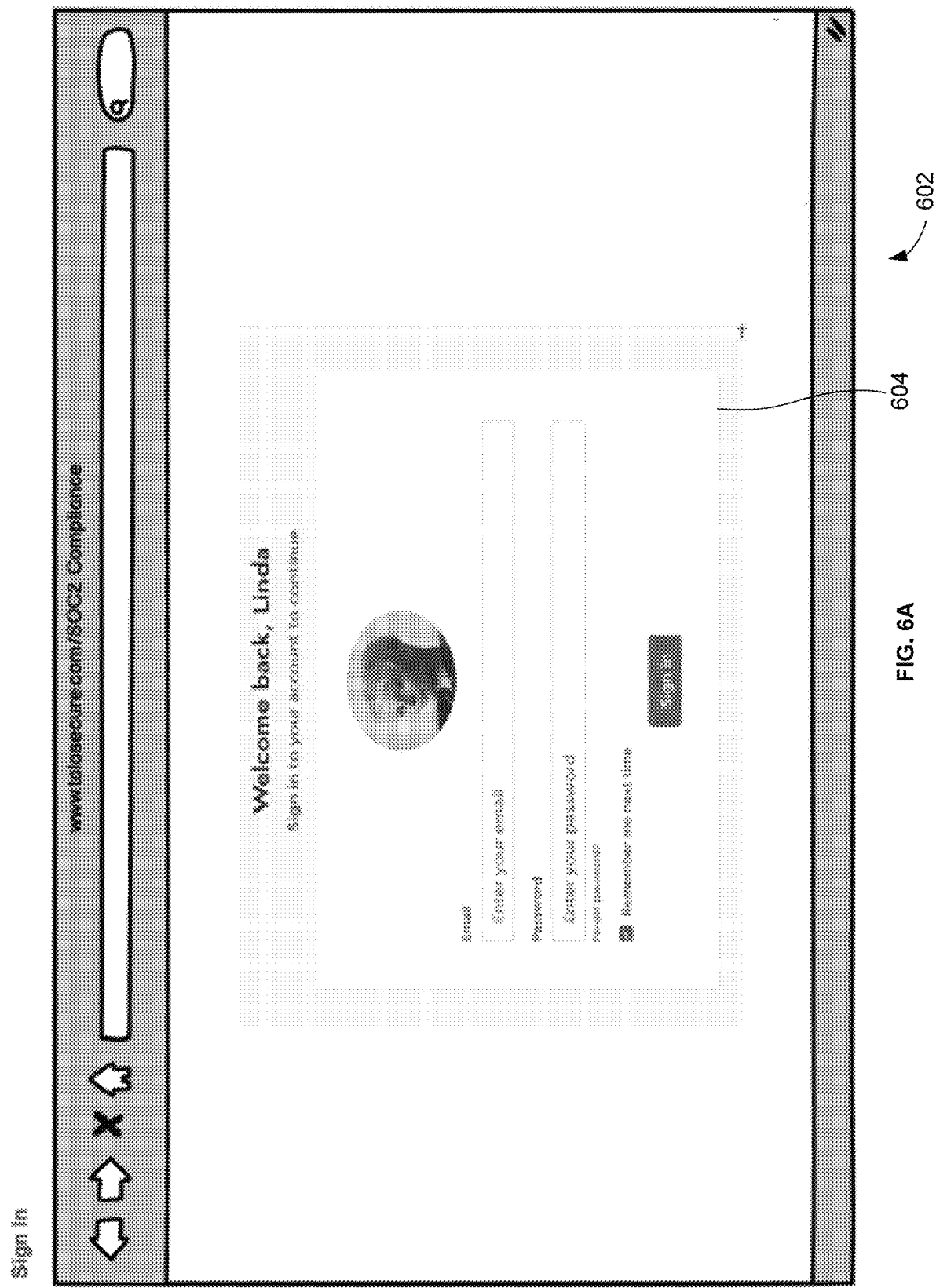
FIGS. 6A-6G illustrate user interface views of the system of FIG. 1 in the computer infrastructure according to some embodiments herein.

FIGS. 6A-6G illustrate user interface views of the system 102 of FIG. 1 in the computer infrastructure according to some embodiments herein. FIG. 6A shows a user interface view 602 of a login page 604. The login page 604 enables the user to enter an email id and a password for the account. The account may be an AWS account of a user application. In some embodiments, the system 102 includes a sign-up page with a user interface that enables new users to register for an account.

Figure 6B:
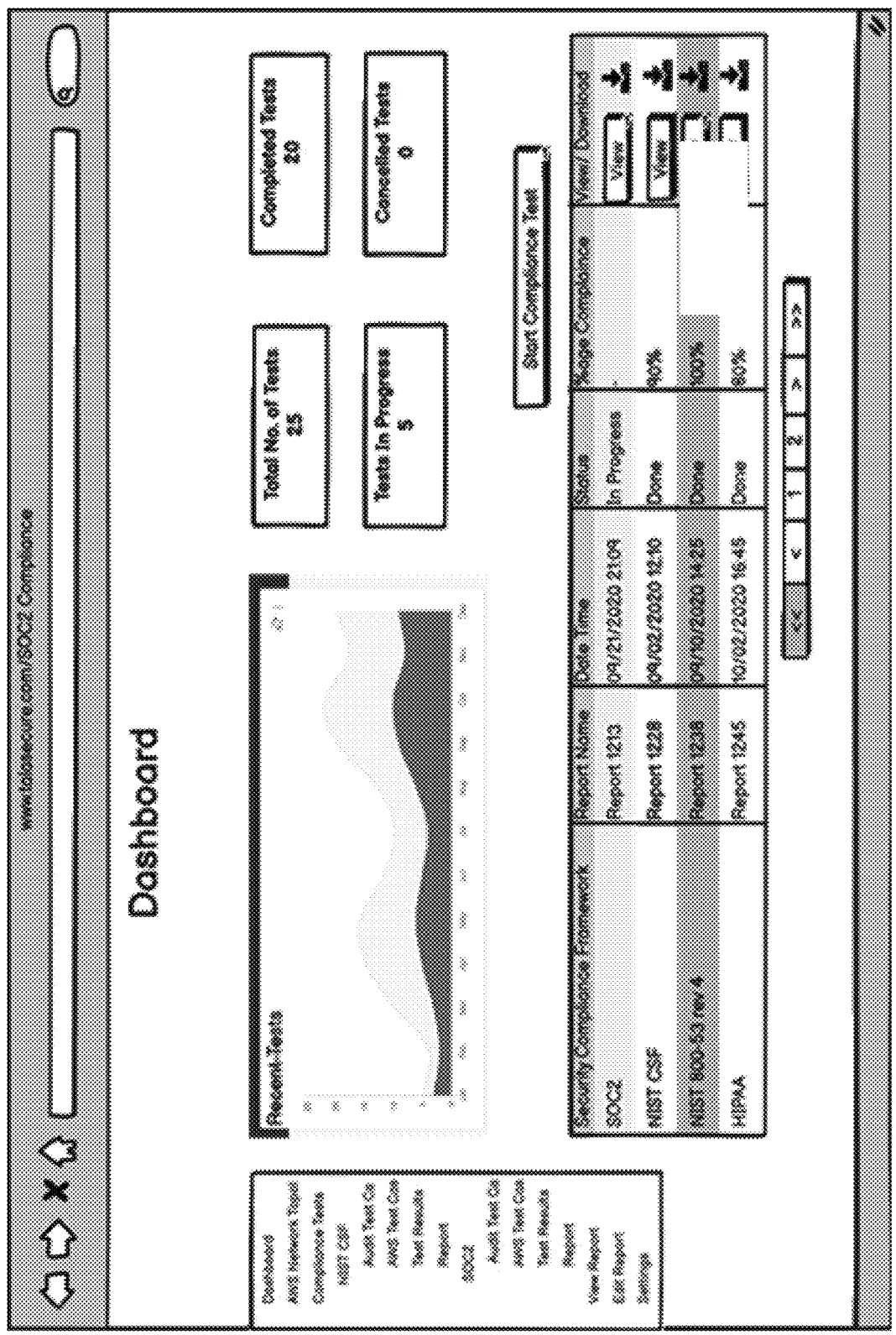

FIG. 6B shows a user interface view 606 of a dashboard. The dashboard shows a graph for total tests and completed tests for the recent tests for a specified time period. The specified time period may be a month or a week. The user interface view 606 enables the user to start the compliance tests, view the status of the compliance tests, and view or download the report of the compliance tests. In some embodiments, the status of the compliance tests includes at least one of (i) IN PROGRESS, (ii) DONE, (iii) NOT YET STARTED, or (iv) CANCELLED. In some embodiments, the status of the compliance tests in the user interface view 606 are colored based on the status. It may be in GREEN color if the status is DONE, AMBER color if the status is IN PROGRESS, and RED if the status is CANCELLED. The compliance tests may be cancelled only if the user wants to cancel or the environment is not ready or taking more time. The user interface view 606 includes a percentage of compliance for the compliance tests. In some embodiments, the percentage of compliance for the compliance tests in the user interface view 606 are colored based on a percentage number of the compliance. It may be in GREEN color if the percentage number of the compliance is 100%, AMBER color if the percentage number of the compliance is in a range of 80% to 100%, RED color if the percentage number of the compliance is below 80%.

Figure 6C:
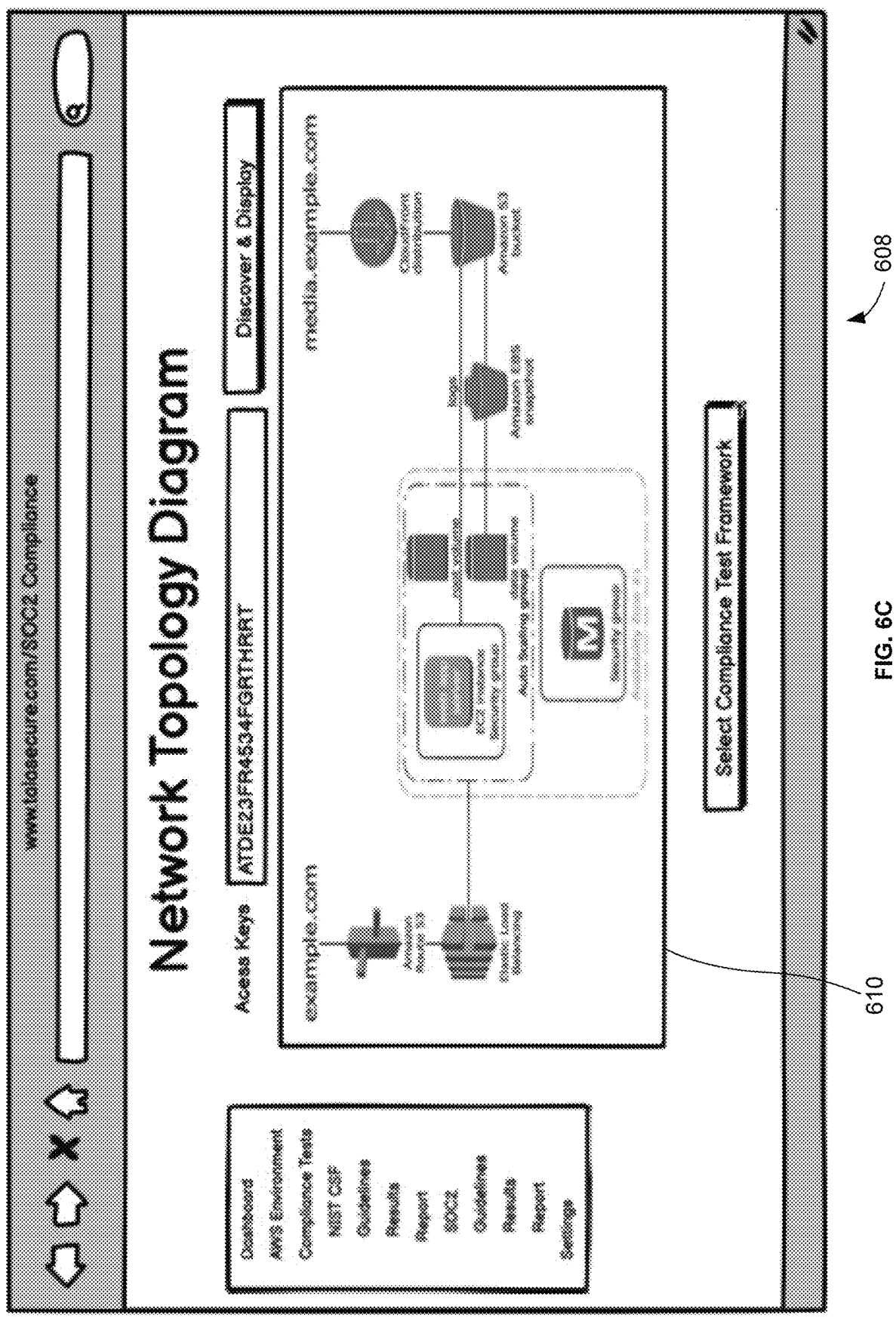

FIG. 6C shows a user interface view 608 of a network topology diagram 610. The network topology diagram 610 is the network topology map of the one or more cloud platforms 108A-N that is generated by querying the one or more information data. The user interface view 608 enables the user to select the framework for compliance test. In some embodiments, the network topology map or a relationship diagram are created based on the AWS components and services used in the system 102.

Figure 6D:
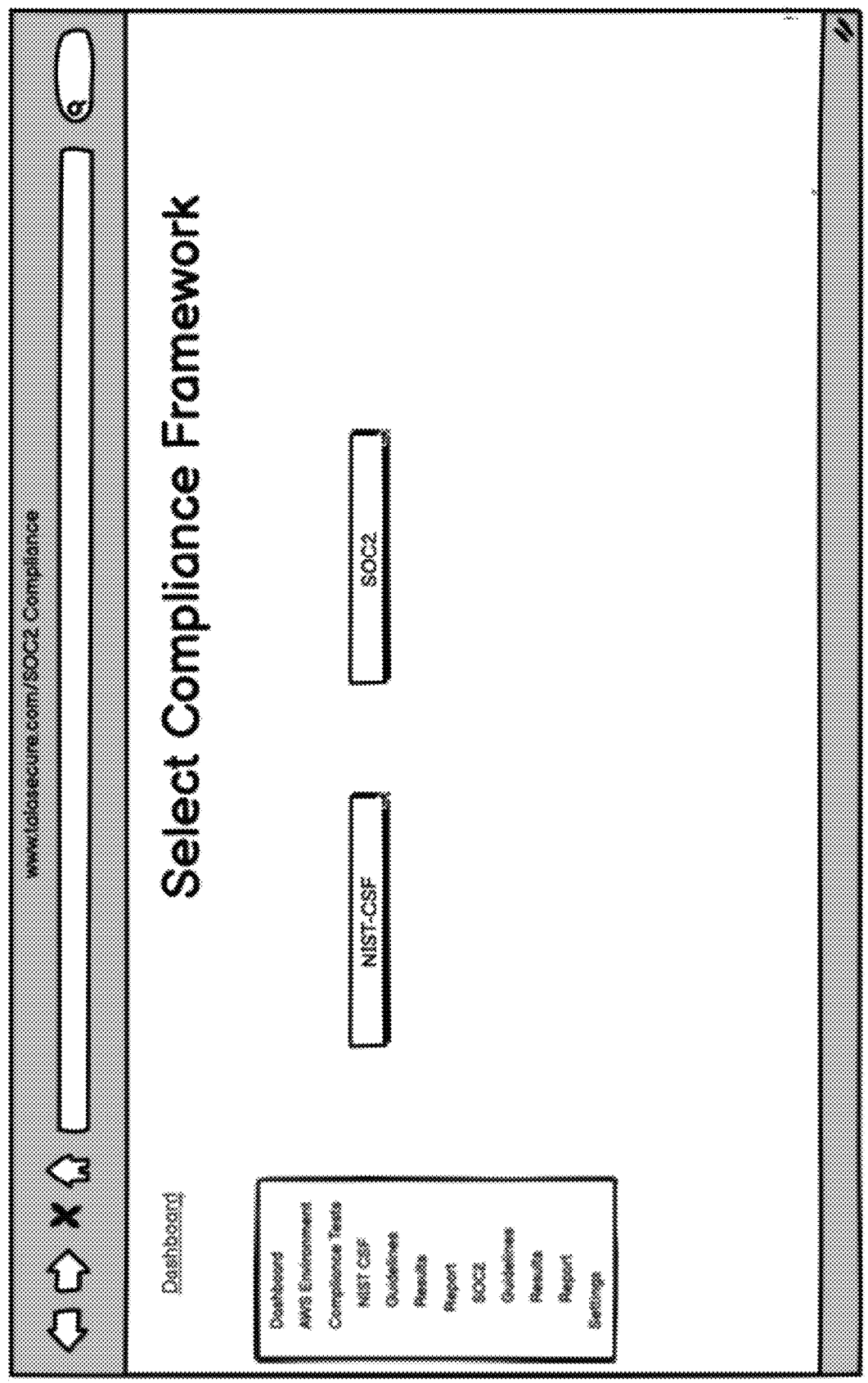
Figure 6E:
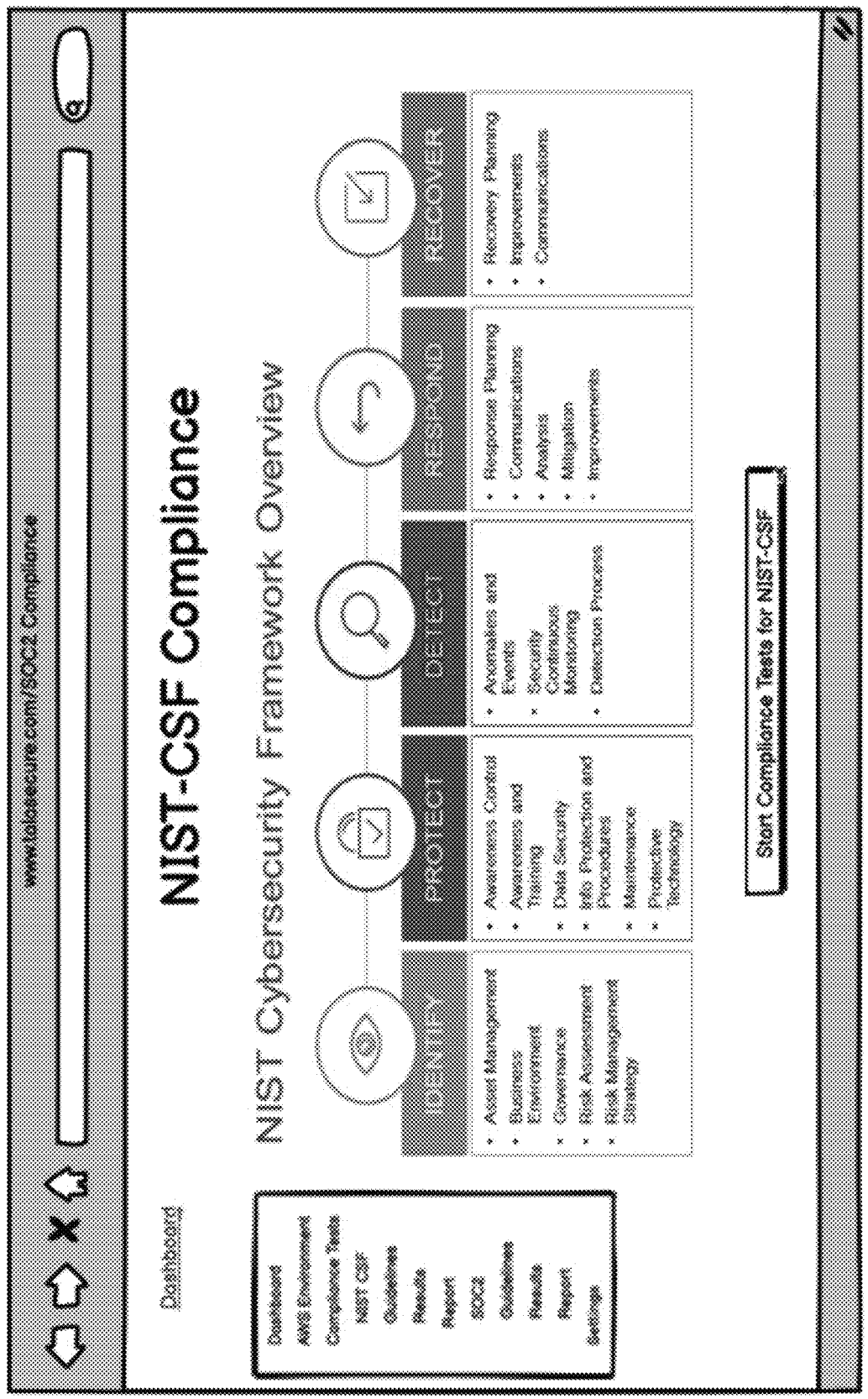

FIG. 6D shows a user interface view 612 of the compliance framework that enables the user to select at least one of the compliance framework. The compliance framework includes NIST-CSF and SOC2. The user may select at least one of the compliance frameworks to run the compliance tests. FIG. 6E shows a user interface view 614 of a home page of a NIST-CSF compliance when the user selects the NIST-CSF as the compliance framework in FIG. 6D. The user interface view 614 displays at least one of the rules and criteria for the NIST-CSF compliance framework. The user interface view 614 enables the user to start the compliance tests for the NIST-CSF compliance.

The system 102 may provide a user interface view of audit test cases of the NIST-CSF compliance. The user interface view is a form that enables the user to enter compliance for required categories along with evidences. In some embodiments, the entered compliance or issues may be updated in third-party applications including Zendesk or JIRA as trouble tickets or in a bug tracking system. In some embodiments, the user interface view includes tabs to cover all the audit test cases. The user interface view enables the user to select AWS compliance tests for NIST-CSF.

In an example, the system 102 provides a user interface view of AWS automation test cases of the NIST-CSF compliance. The user interface view displays all NIST-CSF automation test cases in tabs for each function like IDENTIFY, PROTECT, DETECT, RESPOND, and RECOVER. The user interface view enables the user to select Run AWS compliance tests for NIST-CSF. In another example, the system 102 provides a user interface view of AWS test results of the NIST-CSF compliance. The AWS test results include control ID and description, configuration rule, compliance type describing compliant or non-complaint, seventy describing at least one of Critical, High, Medium or Low, and annotations. In some embodiments, the severity is filtered with a selection by the user. The severity may be High by default. The user interface view 620 enables the user to select Go to Report to display the report.

Figure 6F:
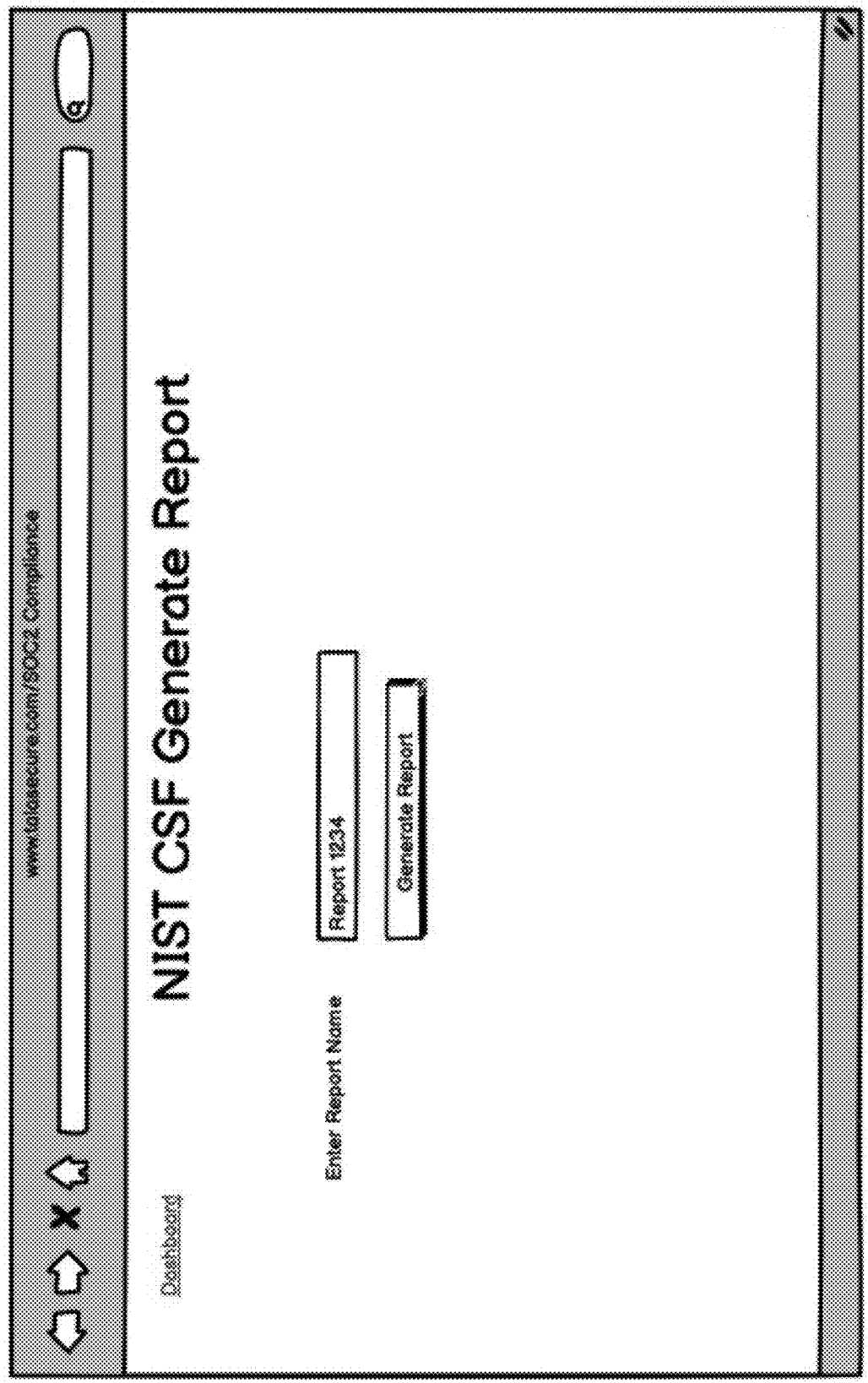

FIG. 6F shows a user interface view 616 of a report generation of the NIST-CSF compliance. The user interface view 616 enables the user to enter a report name to generate the report. In some embodiments, the user interface view 616 of the report generation is a pop up window.

In yet another example, the system 102 provides a user interface view of a report of the NIST-CSF compliance. The user interface view of the report of the NIST-CSF compliance is for the audit test cases and the AWS test cases in separate tabs. The user interface view enables the user to save the report as PDF with an option.

Figure 6G:
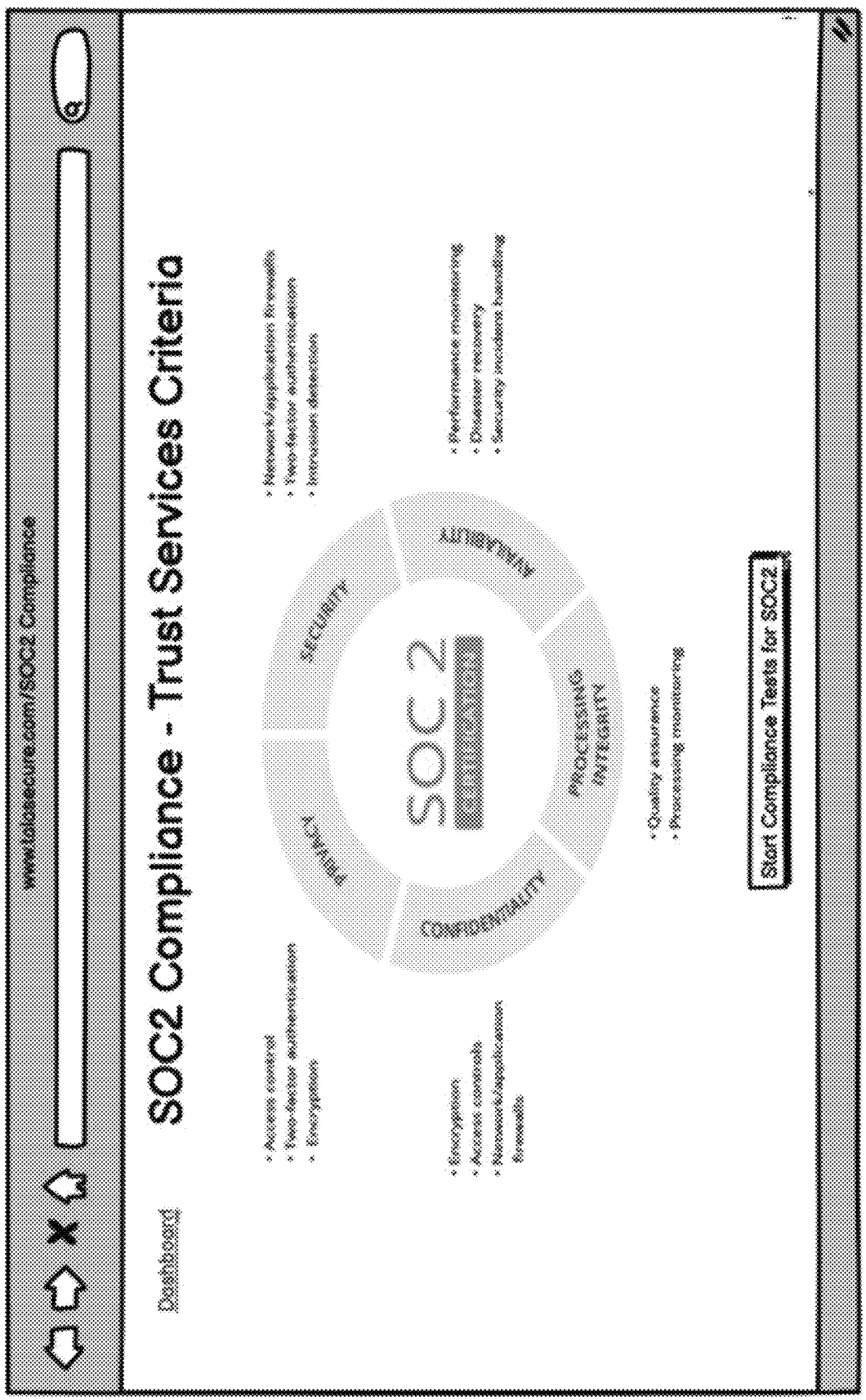

FIG. 6G shows a user interface view 618 of a home page of a SOC2 compliance when the user selects the SOC2 as the compliance framework in FIG. 6D. The user interface view 618 displays at least one of the rules and criteria for the SOC2 compliance framework. The user interface view 618 enables the user to start the compliance tests for the SOC2 compliance.

In yet another example, the system 102 provides a user interface view of the SOC2 compliance. The user interface view includes filled details for a supporting document, test results and observations of the environment. The user interface view enables the user to run the AWS SOC2 tests.

In yet another example, the system 102 provides a user interface view displaying test results. In yet another example, the system 102 provides a user interface view displaying whether the system operations are passed or failed. In some embodiments, the user interface view enables the user to move down the passed test cases and failed test cases.

In yet another example, the system 102 provides a user interface view displaying tips for fixing the failed test cases. The user interface view enables the user to generate a SOC2 compliance report with an option.

In yet another example, the system 102 provides a user interface view of a report of the SOC2 compliance. The user interface view of the report of the SOC2 compliance is for audit test cases and AWS test cases in separate tabs. The user interface view enables the user to save the report as PDF with an option.

In yet another example, the system 102 provides a user interface view of running failed test cases in the SOC2 compliance. The user interface view displays the failed test cases and enables the user to run the failed test cases with an option.

Figure 7:
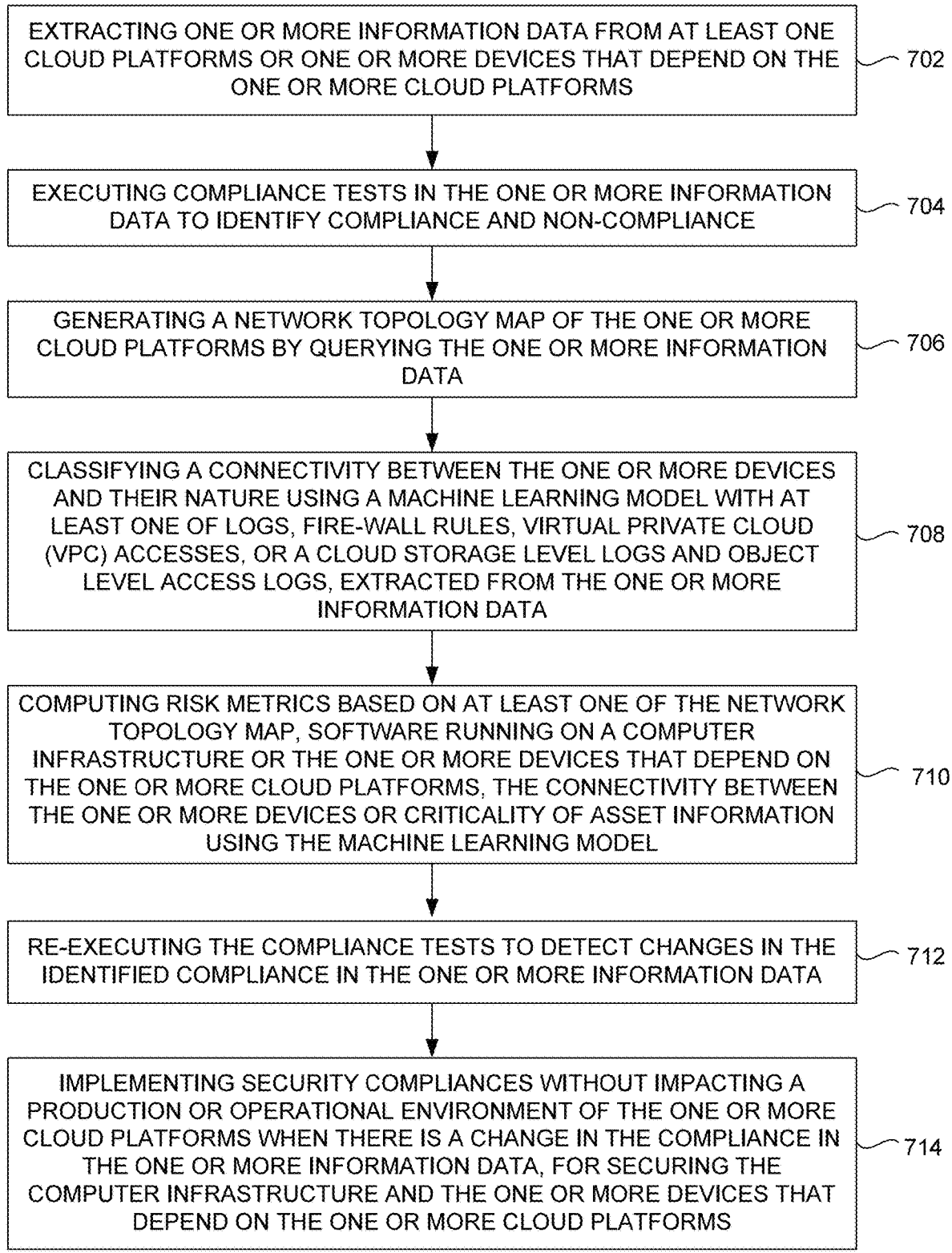
FIG. 7 is a flow diagram illustrating a method for securing computer infrastructure and one or more devices that depend on the one or more cloud platforms using the system of FIG. 1 according to some embodiments herein.

In yet another example, the system 102 provides a user interface view of passed test cases in the SOC2 compliance. The user interface view displays the passed test cases and enables the user to generate a report for the passed test cases, i.e. an updated report of the SOC2 compliance, FIG. 7 is a flow diagram illustrating a method for securing computer infrastructure and one or more devices that depend on the one or more cloud platforms using the system 102 of FIG. 1 according to some embodiments herein. At step 702, one or more information data is extracted from at least one of the cloud platforms or the one or more devices that depend on the one or more cloud platforms. At step 704, the compliance tests are executed in the one or more information data to identify compliance and non-compliance. At step 706, the network topology map of the one or more cloud platforms is generated by querying the one or more information data. At step 708, the connectivity between the one or more devices and their nature is classified using the machine learning model with at least one of logs, fire-wall rules, Virtual Private Cloud (VPC) accesses, or a cloud storage (e.g. an S3 bucket) level logs and object level access logs, extracted from the one or more information data. At step 710, the risk metrics are computed based on at least one of the network topology map, software running on the computer infrastructure or the one or more devices that depend on the one or more cloud platforms, the connectivity between the one or more devices or criticality of the asset information using the machine learning model. At step 712, the compliance tests are re-executed to detect changes in the identified compliance in the one or more information data.

At step 714, the security compliances are implemented without impacting the production or operational environment of the one or more cloud platforms when there is a change in the compliance in the one or more information data, for securing the computer infrastructure and the one or more devices that depend on the one or more cloud platforms.

Figure 8:
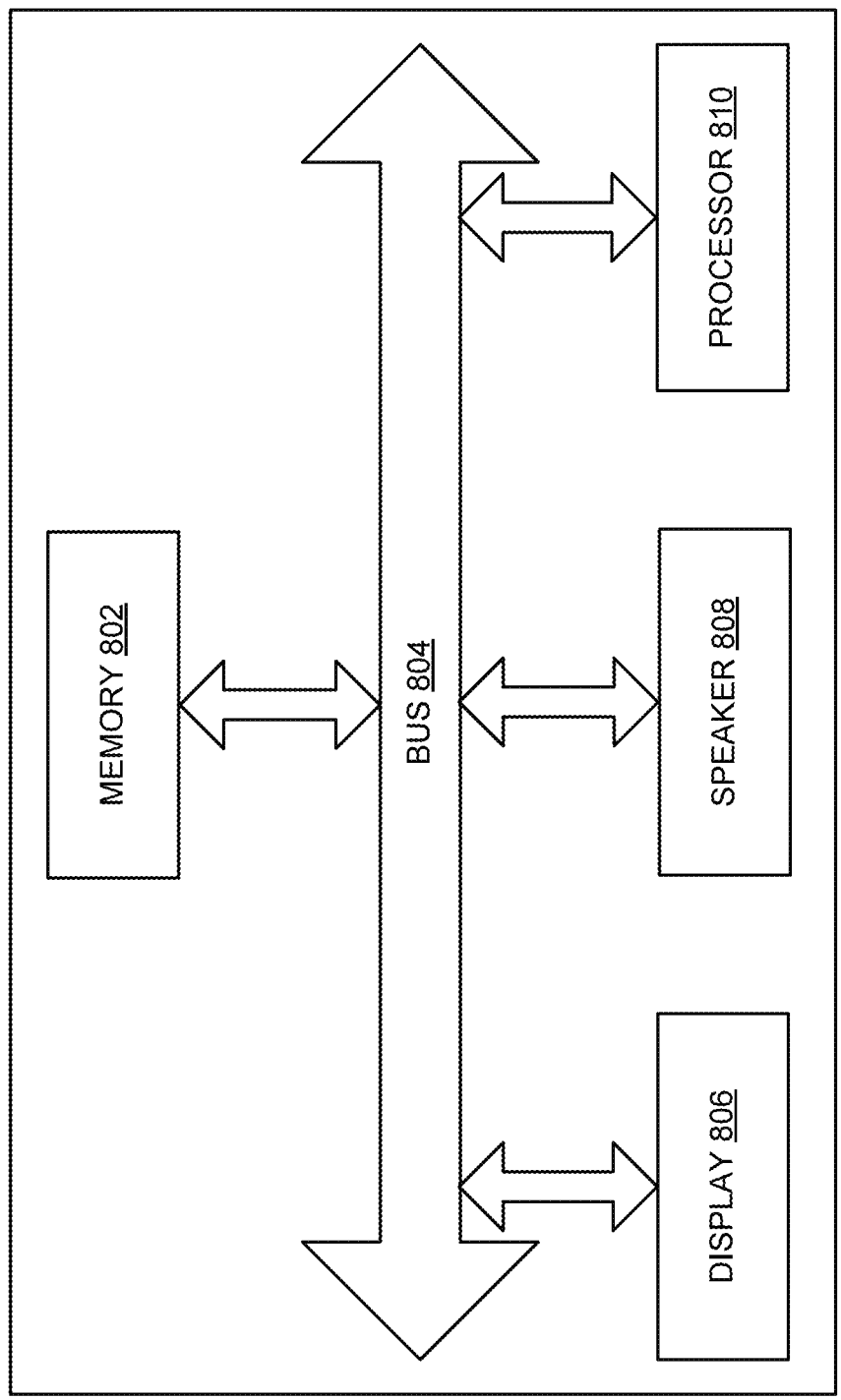
FIG. 8 illustrates an exploded view of a system according to the embodiments herein.

FIG. 8 illustrates an exploded view of the system 102 having a memory 802 having a set of computer instructions, a bus 804, a display 806, a speaker 808, and a processor 810 capable of processing a set of instructions to perform any one or more of the methodologies herein, according to an embodiment herein. The processor 810 may also enable digital content to be consumed in the form of a video for output via one or more displays 806 or audio for output via speaker and/or earphones 808. The processor 810 may also carry out the methods described herein and in accordance with the embodiments herein.

Digital content may also be stored in the memory 802 for future processing or consumption. The memory 802 may also store program specific information and/or service information (PSI/SI), including information about digital content (e.g. the detected information bits) available in the future or stored from the past. A user of the personal communication device may view this stored information on display 806 and select an item for viewing, listening, or other uses via input, which may take the form of a keypad, scroll, or another input device (s) or combinations thereof. When digital content is selected, the processor 810 may pass information. The content and PSI/SI may be passed among functions within the personal communication device using the bus 804.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact dis-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 9:
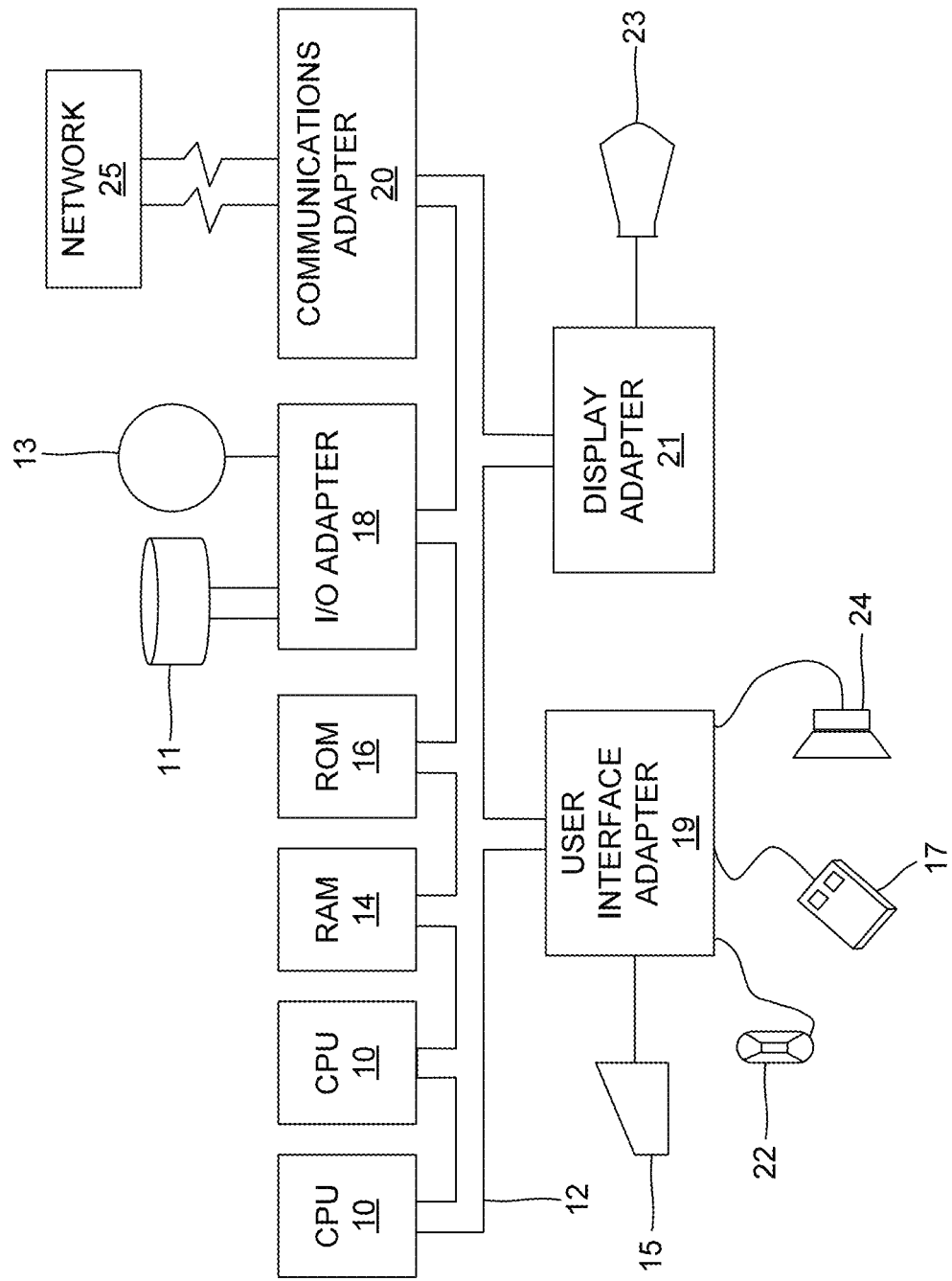
FIG. 9 is a schematic diagram of a computer architecture used in accordance with the embodiment herein.

A representative hardware environment for practicing the embodiments herein is depicted in FIG. 9. This schematic drawing illustrates a hardware configuration of an information handling/computer system in accordance with the embodiments herein. The system includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not show) or a remote control to a bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for securing computer infrastructure and one or more devices that depend on one or more cloud platforms, wherein the system comprises,
a memory that stores a set of instructions; and
a processor that executes the set of instructions, wherein the processor is configured to:
extract one or more information data from at least one of the cloud platforms or the one or more devices that depend on the one or more cloud platforms, wherein the one or more information data comprises at least one of system information from the one or more cloud platforms, configuration information, system information from cloud platform associated services, non-cloud infrastructure information, or asset information, wherein the system information from the one or more cloud platforms comprises users, an access right associated with the users, an authentication method associated with the users, groups associated with the users, VPC configuration information and assets contained in the VPC configuration information, wherein the configuration information comprises the VPC configuration information and the assets contained in the VPC configuration, wherein the non-cloud infrastructure information comprises endpoint configuration security information comprising at least one of use of encrypted storage, Virtual Private Network (VPN), 2FA, antivirus checkers, whitelist of applications or traffic monitoring, from the one or more devices, wherein the asset information comprises physical security information using management asset systems;

execute compliance tests to identify compliance and non-compliance in the one or more information data;

generate a network topology map of the one or more cloud platforms by querying the one or more information data, wherein the querying of the one or more information data comprises (i) identifying an environment with the one or more information data, (ii) creating a tree for the identified environment, and (iii) converting the tree into a directed graph, wherein the directed graph generates the network topology map using a rendering engine;

classify, using a machine learning model, a connectivity between the one or more devices and their nature with at least one of logs, fire-wall rules, Virtual Private Cloud (VPC) accesses, or a cloud storage level logs and object level access logs, extracted from the one or more information data, wherein the machine learning model is configured to (i) record the connectivity between the one or more devices that are consolidated under the one or more cloud platforms and (ii) analyse the records to determine which endpoints of the one or more devices that are in connectivity with each other;

compute, using the machine learning model, risk metrics based on at least one of the network topology map, software running on the computer infrastructure or the one or more devices that depend on the one or more cloud platforms, the connectivity between the one or more devices or criticality of the asset information;

re-execute the compliance tests to detect changes in the identified compliance in the one or more information data; and implement security compliances without impacting a production or operational environment of the one or more cloud platforms when there is a change in the compliance in the one or more information data, for securing the computer infrastructure and the one or more devices that depend on the one or more cloud platforms.

2. The system of claim 1, wherein the processor is configured to:
determine at least one of logging systems, monitoring systems, protections systems, virus checkers, incidence response systems, backup systems, recovery systems that are present for each and every asset in the one or more cloud platforms before executing the compliance tests.

3. The system of claim 1, wherein the compliance tests comprise executing of compliance rules in the one or more information data, wherein the compliance rules comprise at least one of AWS security rules or third-party security rules.

4. The system of claim 1, wherein the processor is configured to:

identify missing controls in the one or more cloud platforms, wherein the missing controls comprise at least one of a missing 2-factor authentication or a use of VPN for management; and
provide information of the missing controls to a user.

5. The system of claim 1, wherein the processor is configured to enable addition of meta-information that enables the user to include the meta-information after generating the network topology map of the one or more cloud platforms, wherein the meta-information comprises at least one of criticality of resources, links to disaster recovery plans, incidence response plans, business continuity importance, or results of penetration tests.

6. The system of claim 1, wherein the processor is configured to:
implement the security compliances as a regular scheduled check for the compliance and security; and
generate reports when there is the regular scheduled check or when there is the change in the compliance.

7. The system of claim 1, wherein the processor is configured to:
generate the report in a machine-readable report format that enables exchange of information between the one or more devices with verification of compliance between different devices.

8. A method for securing computer infrastructure and one or more devices that depend on one or more cloud platforms, wherein the method comprises,
extracting one or more information data from at least one of the cloud platforms or the one or more devices that depend on the one or more cloud platforms, wherein the one or more information data comprises at least one of system information from the one or more cloud platforms, configuration information, system information from cloud platform associated services, non-cloud infrastructure information or asset information, wherein the system information from the one or more cloud platforms comprises users, an access right associated with the users, an authentication method associated with the users, groups associated with the users, VPC configuration information and assets contained in the VPC configuration information, wherein the configuration information comprises the VPC configuration information and the assets contained in the VPC configuration, wherein the non-cloud infrastructure information comprises endpoint configuration security information comprising at least one of use of encrypted storage, Virtual Private Network (VPN), 2FA, antivirus checkers, whitelist of applications or traffic monitoring, from the one or more devices, wherein the asset information comprises physical security information using management asset systems;

executing compliance tests to identify compliance and non-compliance in the one or more information data;

generating a network topology map of the one or more cloud platforms by querying the one or more information data, wherein the querying of the one or more information data comprises (i) identifying an environment with the one or more information data, (ii) creating a tree for the identified environment, and (iii) converting the tree into a directed graph, wherein the directed graph generates the network topology map using a rendering engine;

classifying, using a machine learning model, a connectivity between the one or more devices and their nature with at least one of logs, fire-wall rules, Virtual Private Cloud (VPC) accesses, or a cloud storage level logs and object level access logs, extracted from the one or more information data, wherein the machine learning model is configured to (i) record the connectivity between the one or more devices that are consolidated under the one or more cloud platforms and (ii) analyse the records to determine which endpoints of the one or more devices that are in connectivity with each other;

computing, using the machine learning model, risk metrics based on at least one of the network topology map, software running on the computer infrastructure or the one or more devices that depend on the one or more cloud platforms, the connectivity between the one or more devices or criticality of the asset information;

re-executing the compliance tests to detect changes in the identified compliance in the one or more information data; and implementing security compliances without impacting a production or operational environment of the one or more cloud platforms when there is a change in the compliance in the one or more information data, for securing the computer infrastructure and the one or more devices that depend on the one or more cloud platforms.

9. The method of claim 8, wherein the method comprises determining any logging, monitoring, protections, virus checkers, incidence response systems, backup, recovery system for each and every asset in the one or more cloud platforms before executing the compliance tests.

10. The method of claim 8, wherein the compliance tests comprise executing of compliance rules in the one or more information data, wherein the compliance rules comprise at least one of AWS security rules or third-party security rules.

11. The method of claim 8, wherein the method comprises identifying missing controls in the one or more cloud platforms, wherein the missing controls comprise at least one of a missing 2-factor authentication or a use of VPN for management; and providing information of the missing controls to a user.

12. The method of claim 8, wherein the method comprises enabling addition of meta-information that enables the user to include the meta-information after generating the network topology map of the one or more cloud platforms, wherein the meta-information comprises at least one of criticality of resources, links to disaster recovery plans, incidence response plans, business continuity importance, or results of penetration tests.

13. The method of claim 8, wherein the method comprises implementing the security compliances as a regular scheduled check for the compliance and security; and generating reports when there is the regular scheduled check or when there is the change in the compliance.

14. The method of claim 8, wherein the method comprises generating the report in a machine-readable report format that enables exchange of information between the one or more devices with verification of compliance between different devices.

* * * * *